United States Patent [19]

Zaloum et al.

[11] Patent Number: 5,236,498
[45] Date of Patent: Aug. 17, 1993

[54] QUINACRIDONE SOLID SOLUTIONS HAVING UNIQUE STYLING APPLICATIONS

[75] Inventors: Charles G. Zaloum, North Haledon, N.J.; Michael J. Greene, Mt. Pleasant, S.C.

[73] Assignee: Miles Inc., Pittsburgh, Pa.

[21] Appl. No.: 799,453

[22] Filed: Nov. 26, 1991

[51] Int. Cl.$^5$ ............................................. C08B 48/00
[52] U.S. Cl. .................................. 106/495; 106/497; 106/403; 106/23 R; 546/56; 546/49
[58] Field of Search .................... 106/495, 497; 546/56

[56] References Cited

U.S. PATENT DOCUMENTS

| | | | |
|---|---|---|---|
| 3,157,659 | 11/1964 | Deuschel et al. | 260/279 |
| 3,160,510 | 12/1964 | Ehrich | 106/288 |
| 3,298,847 | 1/1967 | Hanke et al. | 106/288 |
| 3,317,539 | 5/1967 | Jaffe | 260/279 |
| 3,607,336 | 9/1971 | Jaffe | 106/288 Q |
| 3,681,100 | 8/1972 | Jaffe | 106/288 Q |
| 4,099,980 | 7/1978 | North | 106/288 Q |
| 4,895,949 | 1/1990 | Jaffe et al. | 546/56 |

FOREIGN PATENT DOCUMENTS 896916 5/1962 United Kingdom .
955854 4/1964 United Kingdom .

OTHER PUBLICATIONS

E. E. Jaffe, "Quinacridone and some of its derivatives," J.O.C.C.A., 75, 24-31 (1992).
S. S. Labana & L. L. Labana, "Quinacridones," Chemical Reviews, 67, 1-18 (1967).

Primary Examiner—William R. Dixon, Jr.
Assistant Examiner—Margaret V. Einsmann
Attorney, Agent, or Firm—Joseph C. Gil; Richard E. L. Henderson

[57] ABSTRACT

This invention relates to quinacridone solid solutions containing
(a) 95% to 5% by weight of 2,9-dimethoxyquinacridone, and (b) 5% to 95% by weight of 2,9-dichloroquinacridone, characterized by X-ray diffraction patterns that are different from the sum of the X-ray diffraction patterns of the individual quinacridone components. The invention further relates to the use of such solid solutions for pigmentation of fibers, plastics, coatings, printing inks, and the like.

7 Claims, 7 Drawing Sheets

QUINACRIDONE SOLID SOLUTIONS HAVING UNIQUE STYLING APPLICATIONS

BACKGROUND OF THE INVENTION

The present invention relates to new solid solutions of quinacridones and to their use for pigmentation of, for example, fibers, plastics, coatings, and printing inks. In particular, this invention relates to violet compositions containing 95% to 5% by weight of 2,9-dimenthoxyquinacridone and 5% to 95% by weight of 2,9-dichloroquinacridone mixed under certain conditions with each other to form violet solid solutions that are quite different from both physical mixtures of such compounds and from the individual compounds themselves.

The term "solid solution" as used herein describes a well recognized physical property of certain solid substances. In a solid solution, the molecules of the components enter is not the same crystal lattice, usually (but not always) the crystal lattice characteristic of one of the components. The X-ray pattern of the resulting crystalline solid is characteristic and can be clearly differentiated from the pattern of a physical mixture of the same components in the same proportion. Thus, the X-ray peaks of each component of a physical mixture can be distinguished, whereas a characteristic of a solid solution is the disappearance and/or shift of many of these peaks.

Solid solutions of quinacridone pigments have been reported to provided advantageous color properties. For example, U.S. Pat. Nos. 3,160,510, 3,298,847, and 4,895,949 disclose solid solutions of ring-substituted quinacridone pigments said to have improved tinctorial and lightfastness properties. Suitable methods for preparing such solid solutions of quinacridones are also described, for example, in U.S. Pat. No. 3,607,336 and British Patents 896,916 and 955,854. Although quinacridones having a variety of ring substituents, including methoxy and chloro substituents, are disclosed, these patents do not exemplify solid solutions of 2,9-dimethoxyquinacridone and 2,9-dichloroquinacridone and do not suggest the special advantages of such solid solutions of the present invention. Example 13F of U.S. Pat. No. 3,160,510, for example, discloses a solid solution of 90 parts 2,9-dimethoxyquinacridone and 10 parts 2,9-dimethylquinacridone. Comparison of the color properties of this solid solution with the corresponding physical mixture shows that the solid solution exhibits less chroma (an indication of brightness) than the physical mixture. Low chroma is perceived as a dullness feature and is not desirable. In contrast, the solid solutions of the present invention are typically higher in chroma than the physical mixtures.

Two important properties of the present invention render the new products particularly useful as pigments. First, in contrast to simple physical mixtures wherein the color is usually a direct function of the additive effects of the two components, the new solid solutions of the present invention show unexpectedly and unpredictably advantageous tinctorial properties.

A second valuable property of the invention is an enhancement of lightfastness, which frequently accompanies the formation of solid solution. In physical mixtures of two pigments, the components show their individual behaviors upon exposure to light, often resulting in marked changes of hue as one pigment component fades more than the other. In contrast, however, the solid solutions of the present invention behave as a single substance with respect to hue stability.

The solid solutions of 2,9-dimethoxyquinacridone and 2,9-dichloroquinacridone according to the invention are very clean, very bright, violet, non-bleeding pigments exhibiting a deep, transparent masstone. The cleanness, brightness, blue hue, and excellent lightfastness of the solid solution pigments of the invention allow them to be used in styling with other pigment types in a manner that cannot currently be accomplished commercially. Where optimum bluish hue is desired, solid solutions in which the content of 2,9-dimethoxyquinacridone is from 50 to 80% by weight are particularly preferred. Physical mixtures of the individual quinacridones lack the brightness, transparency, strength, and performance properties of the solid solutions.

SUMMARY OF THE INVENTION

The present invention relates to violet quinacridone pigment compositions consisting essentially of solid solutions of (a) 95% to 5% by weight of 2,9-dimethoxyquinacridone, and (b) 5% to 95% by weight of 2,9dichloroquinacridone, wherein said pigment compositions are characterized by X-ray diffraction patterns that are different from the sum of the X-ray diffraction patterns of the individual quinacridone components.

The invention further relates to the use of such solid solutions for pigmentation of fibers, plastics, coatings, printing inks, and the like.

DETAILED DESCRIPTION OF THE INVENTION

Figure 1:
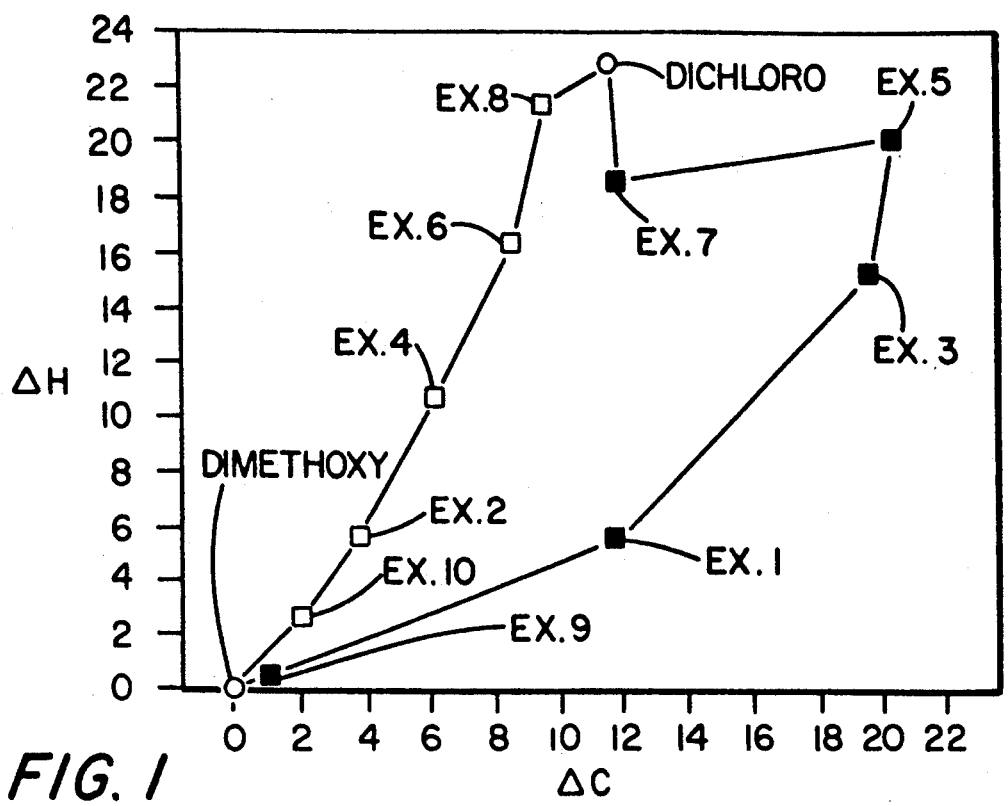
FIG. 1 shows hue and chroma differences (relative to 2,9-dimethoxyquinacridone) between solid solutions and corresponding physical mixtures having various relative amounts of 2,9-dimethoxyquinacridone and 2,9-dichloroquinacridone.

The synthesis of 2,9-dimethoxyquinacridone and 2,9-dichloroquinacridone and their intermediates are well known to those skilled in the art. For example, S. S. Labana and L. L. Labana, "Quinacridones," *Chemical Reviews*, 67, 1-18 (1967), and U.S. Pat. Nos. 3,157,659 and 3,317,539.

Solid solutions of quinacridones can be prepared by any of several procedures known in the art. See, for example, U.S. Pat. Nos. 3,160,510, 3,298,847, 3,607,336, 3,681,100, 4,099,980, and 4,895,949. Suitable procedures include (1) dissolving the crude pigment components in strong mineral acids, such as sulfuric acid, followed by precipitation in a liquid in which they are substantially insoluble, (2) ring closing synthetic intermediates of the quinacridones, before or after oxidation, in strong acids or high boiling solvents, followed by precipitation in a liquid in which they are substantially insoluble, and (3) milling the crude quinacridone components.

When the pigment components are dissolved in strong mineral acid, it is necessary to use a sufficient amount of acid, preferably concentrated acid, to insure complete solution of the derivatives within a reasonable amount of time. However, except for the requirement that solution be complete, the amount and concentration of acid is not critical. For example, but use of the more concentrated acids is preferred for commercial applications. It is particularly preferred to use about 92% to 98% sulfuric acid in amounts of about 10 to 15 parts by weight of acid relative to the quantity of pigment. Although the dissolution rate of the pigments in sulfuric acid can be increased by warming the mixture (for example, to about 50° C.), it is generally preferred to dissolve the pigments in the sulfuric acid at or below 35° C. to minimize sulfonation or degradation of the quinacridones. The pigments are then precipitated by adding the strongly acidic solution to a liquid in which the pigments are substantially insoluble, such as water or methanol or other lower aliphatic alcohols.

Suitable milling methods for preparing solid solutions include dry-milling methods such as sand-milling, ball-milling, and the like, with or without additives, or wet-milling methods such as salt-kneading, bead-milling, and the like in water or organic solvents, with or without additives.

The resultant quinacridone solid solutions are obtained in a form that is already suitable for use as a pigment or can be converted into a suitable form by any after-treatment methods known in the art. After-treatment can be carried out, for example, by swelling the compounds in a strong inorganic acid, such as sulfuric acid, and discharging the mixture into a substance in which they are substantially insoluble, such as cold water or ice. After-treatment can also be carried out by milling with or without milling aids (such inorganic salts or sand) and, if appropriate, in the presence of solvents, such as toluene, xylene, dichlorobenzene, N-methylpyrrolidone, alcohols, or esters. After-treatment can also be carried out by heating a dispersion of the pigment, often in the presence of additives such as surfactants or dispersants, in a suitable solvent. Suitable solvents include organic solvents, such as alcohols, esters, ketones, and aliphatic and aromatic hydrocarbons and derivatives thereof, and organic solvents, such as water.

All of the above-mentioned methods are known to produce solid solutions. The significance of the present invention, however, lies in the unexpected advantages obtained by preparing solid solutions containing 2,9-dimethoxyquinacridone and 2,9-dichloroquinacridone, regardless of the method of synthesis.

The particle size, and thus the tinctorial strength and transparency, of the solid solutions of the invention can be controlled by appropriately varying the methods used for synthesis and after-treatment. For example, the solid solutions can be made more transparent by reducing particle size or more opaque by increasing particle size. Particle size is most often controlled during the precipitation of the pigment of milling of the crude pigment. Additives that serve to lessen or avoid flocculation, increase pigment dispersion stability, and reduce coating viscosity can also be used to control pigment properties. Suitable additives include polymeric dispersants or surfactants and pigment derivatives.

Color properties of quinacridones, including quinacridone solid solutions, are known to be sensitive to numerous process variables not specifically mentioned above. Such variables include the nature of the drowning solvent used to precipitate the solid solutions, the temperature of the drowning solvent, the type of agitation used during the drowning process, the time of the drowning process, and the post-drown processes. These variables are known to affect the crystal phase, particle size and distribution, and surface characteristics, and thus ultimately affect the pigment color properties, such as transparency, hue, tinctorial strength, dispersibility, dispersion stability, and rheology.

Regardless of the particular method used for their preparation, the solid solution pigments of the invention are characterized by X-ray diffraction patterns that differ from the sum of the X-ray diffraction patterns of the individual quinacridone components. The diffraction angles ($2\theta$) of the individual components can, of course, be compared directly with those of the solid solutions. The relative intensities (I) of peaks, however, cannot conveniently be summed. Therefore, instead of combining separately obtained X-ray diffraction patterns of the individual quinacridones, it is preferable to prepare an intimate physical mixture of the individual components in the appropriate relative amounts and to obtain an X-ray diffraction pattern of the resultant physical mixture. Changes in both diffraction angle and relative intensity can thus be more readily visualized.

The solid solution pigments of the invention are also characterized by significant changes in color properties relative to the physical mixtures. Comparison of the color properties of the solid solutions of the invention with those of corresponding physical mixtures are shown in FIG. 1. Hue (a measure of color or hue) and chroma (a measure of brightness) are shown relative to pure 2,9-dimethoxyquinacridone, with positive $\Delta H$ indicating compositions having a "redder" hue and positive $\Delta C$ indicating "brighter" compositions. Physical mixtures of 2,9-dimethoxyquinacridone and 2,9-dichloroquinacridone exhibit values of $\Delta H$ and $\Delta C$ that are almost linearly proportional to the relative quantities of the two components. In contrast, the solid solutions of the invention exhibit almost uniformly higher chroma relative to the physical mixtures (as shown by the overall positive shift in $\Delta C$). Moreover, solid solutions containing at least 75% by weight 2,9-dimethoxyquinacridone are at least as blue as the corresponding physical mixtures.

Compared to the corresponding physical mixtures, the solid solution pigments of the invention are much higher in chroma. This increased chroma greatly improves the brilliancy of formulations (such as paints, plastics, and inks) that use the solid solution pigment to provide color. Therefore, because of their light and migration fastness, the solid solution pigments of the invention are suitable for a variety of pigment applications. For example, solid solution pigments of the invention can be used as the colorant (or one of two or more colorants) for very fast pigmented systems, such as pigmented mixtures with other materials, pigment formulations, paints, printing ink, colored paper, or colored macromolecular materials. The term "mixtures with other materials" is understood to include, for example, mixtures with organic white pigments, such as titanium dioxide (rutile), or with cement. Examples of pigment formulations include flushed pastes with organic liquids or pastes and dispersions with water, dispersants, and, if appropriate, preservatives. Paints in which solid solutions of the invention can be used in any suitable paint vehicle include physically or oxidatively drying lacquers, stoving enamels, reactive paints, two-component paints, solvent- or water-based system paints, emulsion paints for weatherproof coatings, metallic paints containing dispersed metallic particles, and distempers. Printing inks include those known for use in paper, textile, and tinplate printing. Suitable macromolecular substances include those of a natural origin, such as rubber; those obtained by chemical modification, such as acetyl cellulose, cellulose butyrate, or viscose; and those prepared synthetically, such as polymers, polyaddition products, and polycondenstes. Examples of synthetically prepared macromolecular substances include plastic materials, such as polyvinyl chloride, polyvinyl acetate, and polyvinyl propionate; polyolefins, such as polyethylene and polypropylene; polyamides; polymers and copolymers of acrylates, methacrylates, acrylonitrile, acrylamide, butadiene, or styrene; polyurethanes; and polycarbonates. The materials pigmented with the quinacridone solid solution pigments of the invention can have any desired shape or form.

The quinacridone solid solution pigments of the invention are highly water-resistant, oil-resistant, acid-resistant, lime-resistant, alkali-resistant, solvent-resistant, fast to over-lacquering, fast to over-spraying, fast to sublimation, heat-resistant, and resistant to vulcanizing; give very good tinctorial yield; and are readily dispersible, for example, in plastic materials.

The following examples further illustrate details or the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all percentages are percentages by weight.

DESCRIPTION OF THE PREFERRED EMBODIMENTS

Pigments prepared according to the Examples were analyzed by X-ray diffraction using a Siemens D-5000 Spectrometer. Data were collected under the following conditions:

| Power | 50 kV at 40 mA |
|---|---|
| Slits | 1.0 mm divergence |
| | 1.0 mm antiscatter |
| | 0.1 mm detector |
| Step size | 0.01° |
| Step time | 3 seconds |

Differences in hue and chroma were measured using an Applied Color System Spectral Sensor (Hunt Associated Laboratories, Fairfax, Va.) or a Macbeth Xenon Flash instrument (Kollmargan, Newburgh, N.Y.).

EXAMPLES 1 to 10

Examples 1, 3, 5, 7, and 9 describe the preparation of solid solutions of 2,9-dimethoxyquinacridone and 2,9-dichloroquinacridone by dissolving the pigments in concentrated acid and precipitating the solid solution pigment in a liquid in which the pigment is insoluble. Comparison Examples 2, 4, 6, 8, and 10 describe the preparation of the corresponding physical mixtures.

FIG. 1 shows the hue and chroma relative to 2,9-dimethoxyquinacridone ($\Delta H$ and $\Delta C$, respectively) of solid solutions and corresponding physical mixtures having the various relative amounts of 2,9-dimethoxyquinacridone and 2,9-dichloroquinacridone described in Examples 1 to 10.

EXAMPLE 1

A mixture of 7.5 g of 2,9-dimethoxyquinacridone and 2.5 g of 2,9-dichloroquinacridone were added to 150 g of 96% sulfuric acid. The mixture was stirred at room temperature until a homogenous solution was obtained (within about 1 to 2 hours). The resultant intense blue-violet solution was slowly added with stirring to 1000 g of methanol, immediately forming a precipitate. The slurry was stirred at room temperature for 60 minutes and filtered. The presscake was washed with water until free of acid and then slurried in 170 g of water. The slurry was neutralized (pH 7) and then made basic by adding 1 g of 50% sodium hydroxide. The slurry was stirred at room temperature for 30 min, diluted with 200 g methanol, and autoclaved in a 600 mL laboratory Parr reactor at 115°–120° C. for 6 hours. The resultant mixture was cooled to 40°–50° C., filtered, washed with water, and dried to give an essentially quantitative yield of solid solution pigment having an intense violet color.

Figure 2:
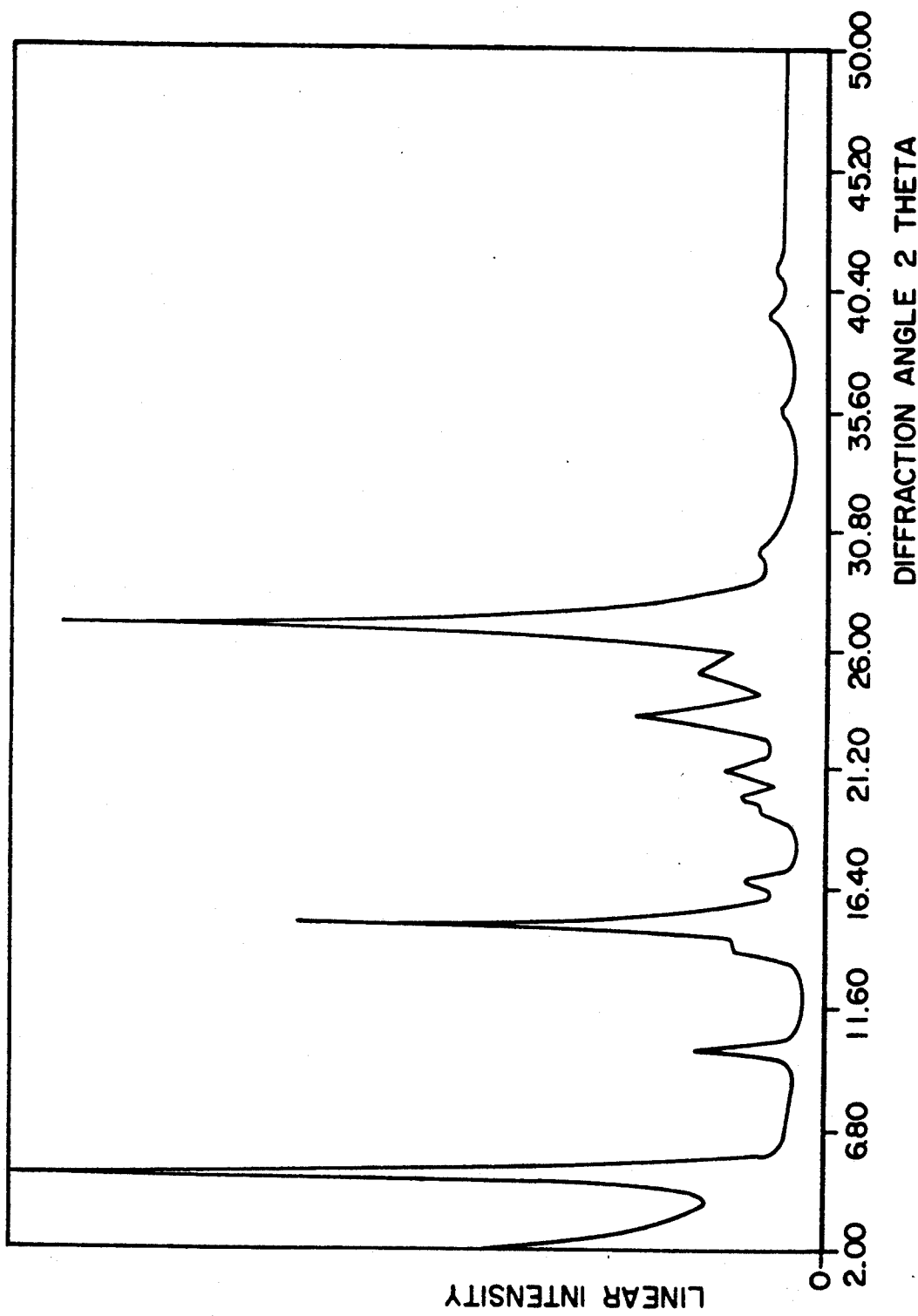
FIGS. 2, 4 and 6 show X-ray diffraction patterns of solid solutions of the invention having various relative amounts of 2,9-dimethoxyquinacridone and 2,9-dichloroquinacridone.

FIG. 2 shows the X-ray diffraction pattern of the solid solution pigment prepared according to Example 1.

EXAMPLE 2

Comparison 2,9-Dimethoxyquinacridone and 2,9dichloroquinacridone were separately conditioned using the solvent autoclaving method described in Example 1. The individual pigments were then physically mixed as powders in the same weight ratio as used in the solid solution prepared according to Example 1.

Figure 3:
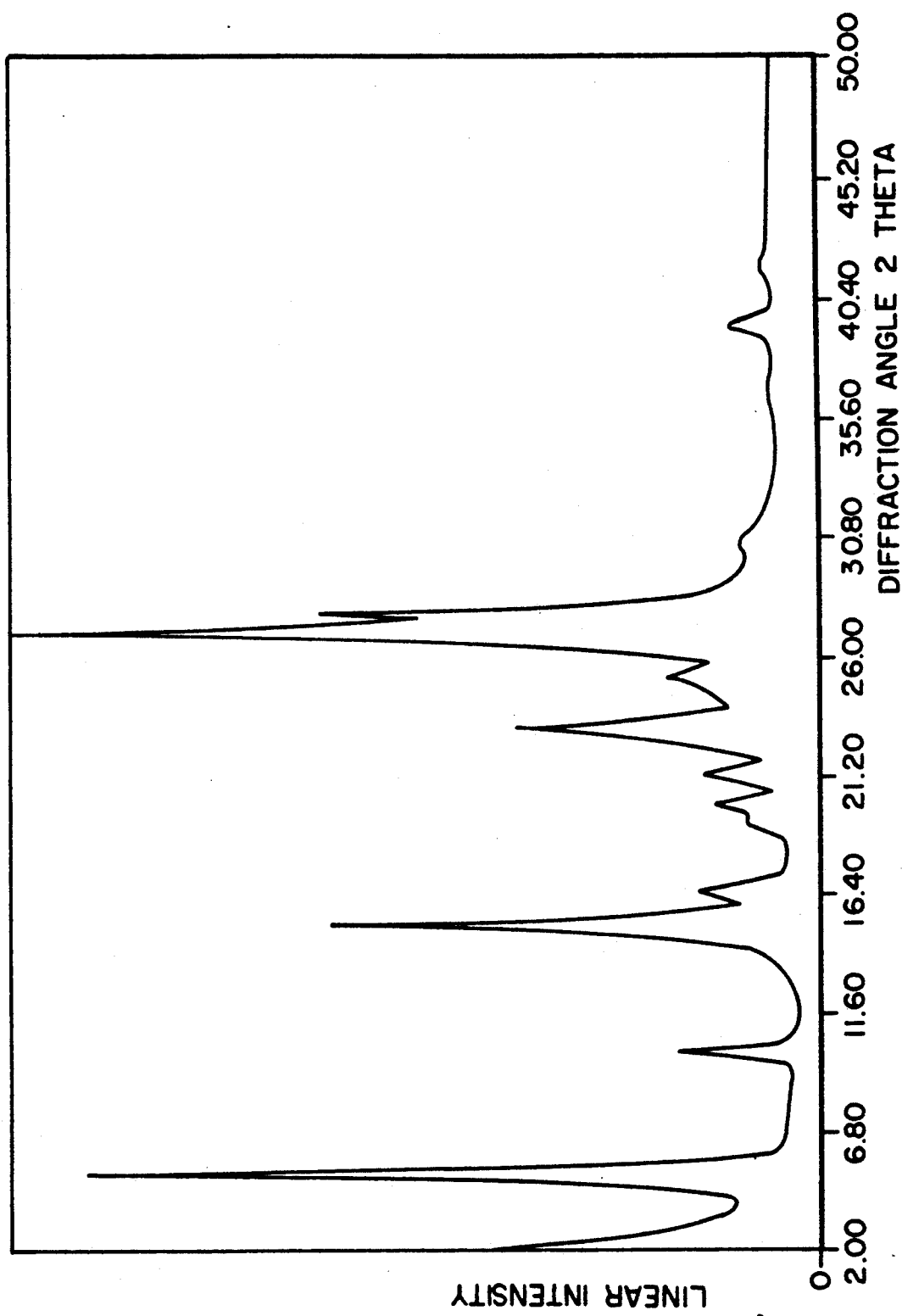
FIGS. 3, 5 and 7 show X-ray diffraction pattern of physical mixtures of 2,9-dimethoxyquinacridone and 2,9-dichloroquinacridone corresponding to the quantities used to prepare the solid solution having the X-ray diffraction pattern shown in FIGS. 2 ,4 and 6, respectively.

FIG. 3 shows the X-ray diffraction pattern of the resultant physical mixture prepared according to comparison Example 2. Comparison of FIGS. 2 and 3 shows that a specific line corresponding to 2,9-dichloroquinacridone at diffraction angle $2\theta$ 27.82° is noticeably absent from the solid solution X-ray pattern. The solid solution also shows a peak at $2\theta$ 14.00° that is not apparent in the physical mixture pattern.

EXAMPLE 3

Example 1 was repeated using 5.0 g of 2,9dimethoxyquinacridone and 5.0 g of 2,9-dichloroquinacridone. The resultant solid solution pigment was noticeably redder than the product of Example 1.

Figure 4:
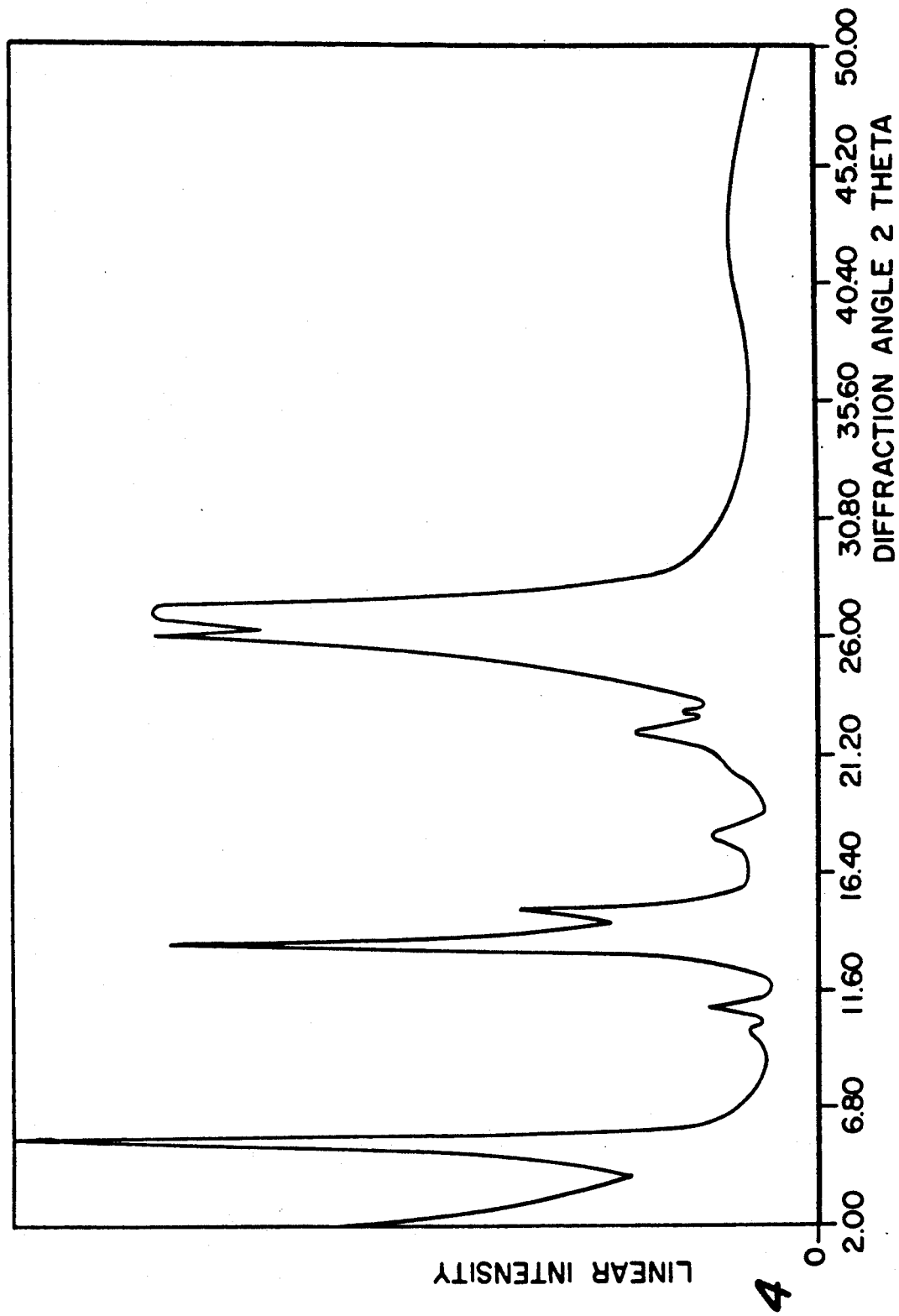

FIG. 4 shows the X-ray diffraction pattern of the solid solution pigment prepared according to Example 3.

EXAMPLE 4

Comparison

Comparison Example 2 was repeated except for using the same weight ratio of pigments as used in the solid solution prepared according to Example 3.

Figure 5:
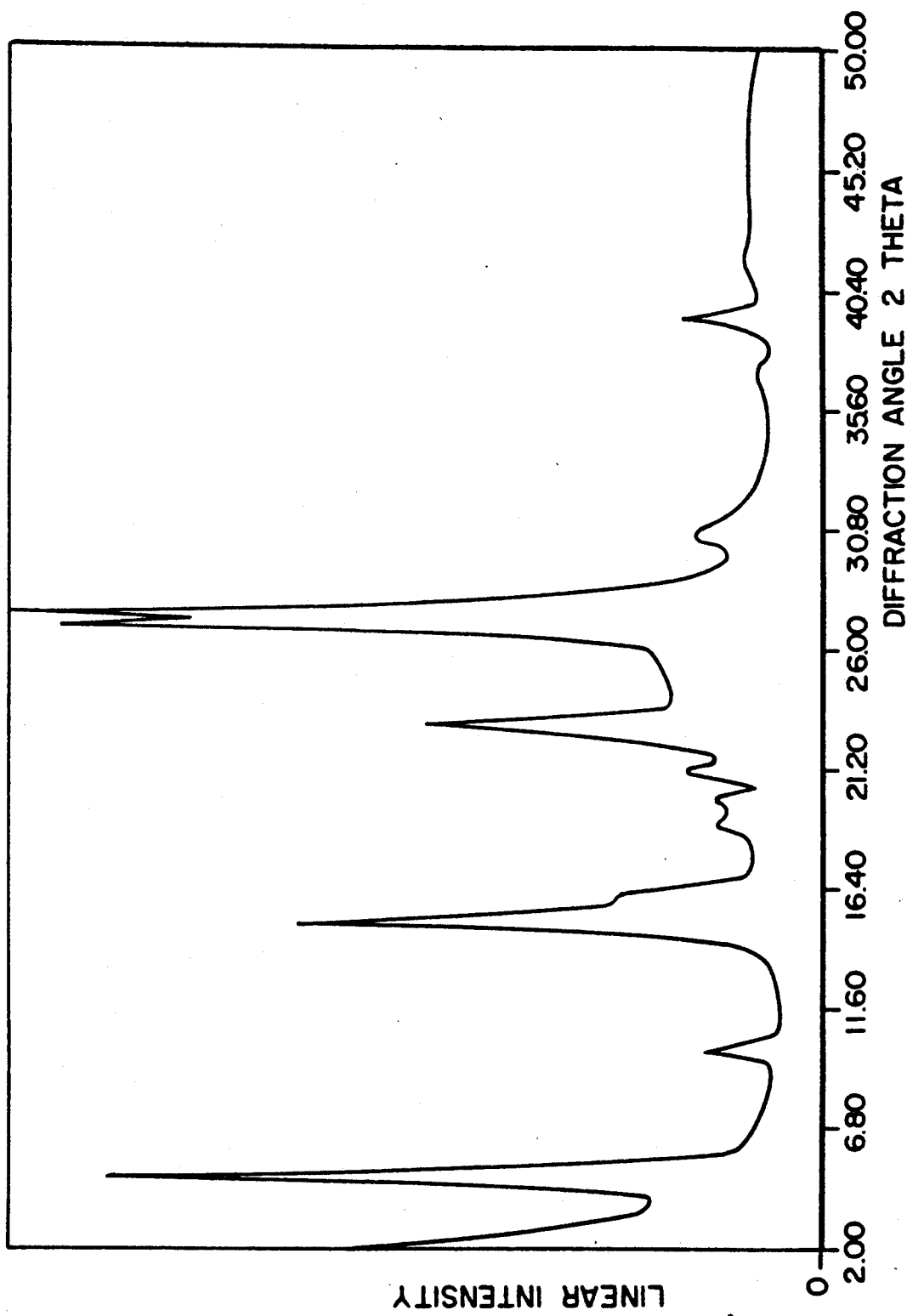

FIG. 5 shows the X-ray diffraction pattern of the resultant physical mixture prepared according to comparison Example 4. Comparison of FIGS. 4 and 5 shows noticeable differences in the diffraction patterns, particularly with respect to peak locations. Most apparent are the following peak shifts:

(a) Shift from diffraction angle $2\theta$ 15.14° (physical mix) to $2\theta$ 13.47° (solid solution).

(b) Shift from $2\theta$ 16.22° (physical mix) to $2\theta$ 14.85° (solid solution).

These are the most obvious shifts because of their high line intensity, but other lines are also shifted. The solid solution crystal lattice does not appear to be similar to either individual component.

EXAMPLE 5

Example 1 was repeated using 2.5 g of 2,9-dimethoxyquinacridone and 7.5 of 2,9-dichloroquinacridone. The resultant solid solution pigment was noticeably redder than the products of Examples 1 and 3.

Figure 6:
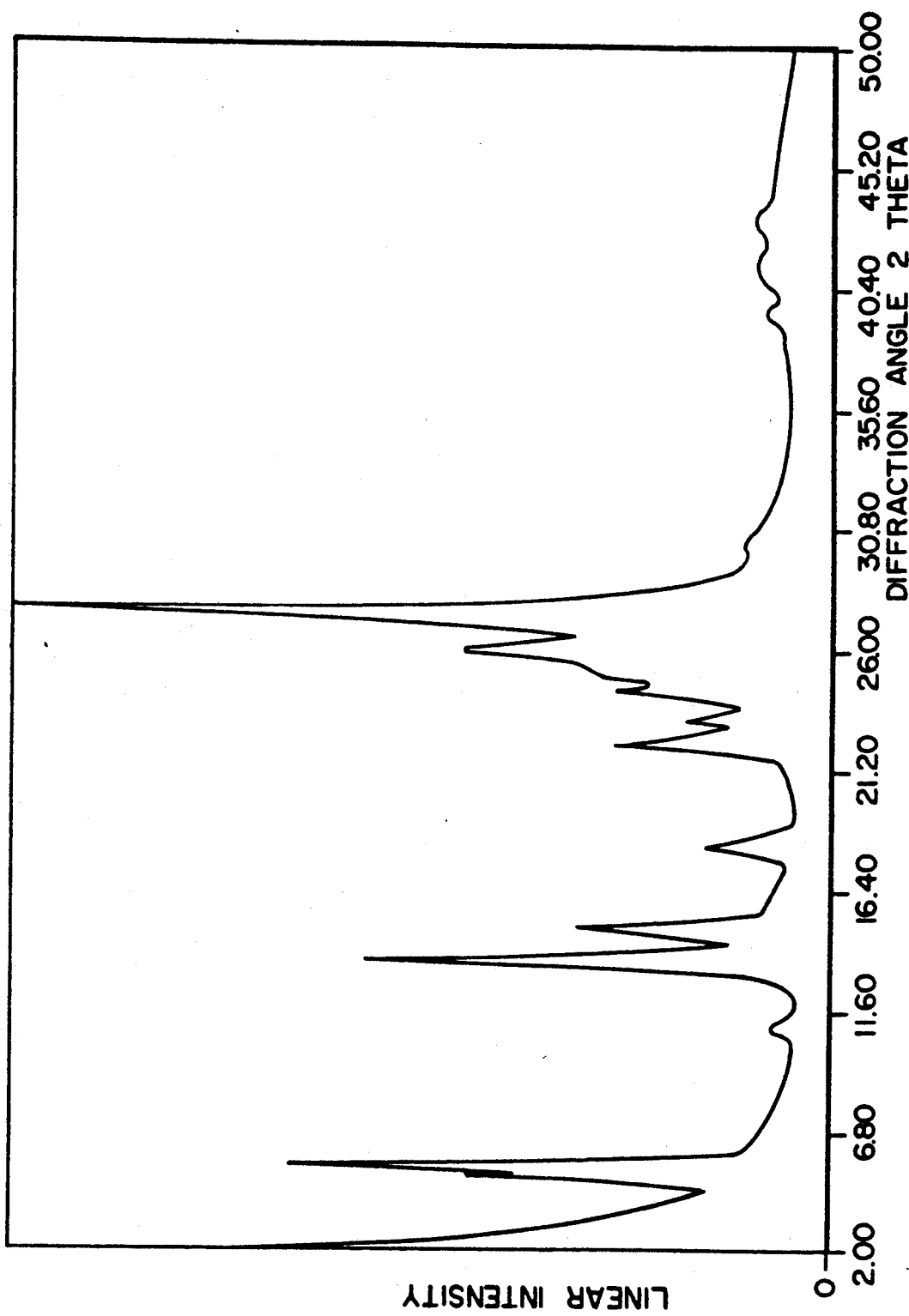

FIG. 6 shows the X-ray diffraction pattern of the solid solution pigment prepared according to Example 5.

EXAMPLE 6

Comparison

Comparison Example 2 was repeated except for using the same weight ratio of pigments as used in the solid solution prepared according to Example 5.

Figure 7:
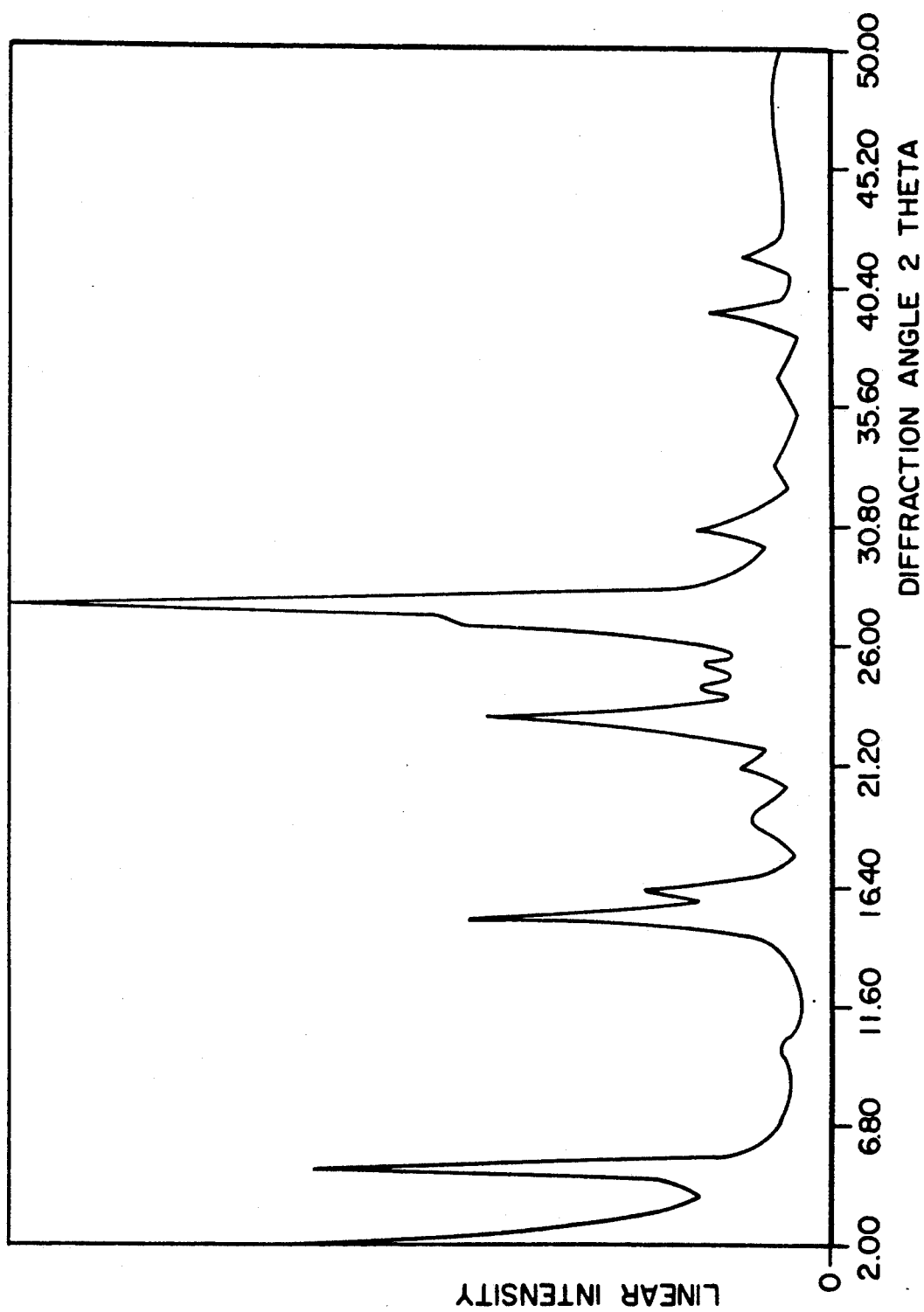

FIG. 7 shows the X-ray diffraction pattern of the resultant physical mixture prepared according to comparison Example 6. Comparison of FIGS. 6 and 7 shows noticeable differences in the diffraction patterns, particularly with respect to peak location. Most apparent are the following peak shifts:

(a) Shift from diffraction angle $2\theta$ 15.17° (physical mix) to $2\theta$ 13.65° (solid solution).

(b) Shift from $2\theta$ 16.28° (physical mix) to $2\theta$ 14.99° (solid solution).

The solid solution crystal lattice does not appear to be similar to either individual component.

As might be expected, comparison of the X-ray diffraction patterns of the physical mixtures described in comparison Examples 2, 4, and 6 reveal few differences in peak locations and exhibit only the expected differences in peak intensities.

EXAMPLE 7

Example 1 was repeated using 1.0 g of 2,9-dimethoxyquinacridone and 9.0 g of 2,9-dichloroquinacridone.

EXAMPLE 8

Comparison

Comparison Example 2 was repeated except for using the same weight ratio of pigments as used in the solid solution prepared according to Example 7.

EXAMPLE 9

Example 1 was repeated using 9.0 of 2,9-dimethoxyquinacridone and 1.0 g of 2,9-dichloroquinacridone.

EXAMPLE 10

Comparison

Comparison Example 2 was repeated except for using the same weight ratio of pigments as used in the solid solution prepared according to Example 9.

EXAMPLE 11

Example 11 describes a general procedure for preparing solid solutions by ring-closure of appropriately substituted 2,5-di(anilino)terephthalic acid intermediates, followed by after-treatment of the resultant crude pigment.

To 4800 g of polyphosphoric acid (117% phosphoric acid) heated at 80°–95° C. was added 600 g of 2,5-di(4-methoxyanilino)terephthalic acid and 200 g of 2,5-di(4-chloroanilino)terephthalic acid. The mixture was heated at 105°–115° C. for 6 hours. The viscous solution was then cooled to 80°–90° C. and slowly poured onto 12,000 g of methanol, with the temperature of the resulting slurry being maintained at less than 35° C. by external cooling and adjustment of the addition rate. The slurry was stirred at room temperature for 1 hour, heated to reflux (68°–72° C.) for 1 hour, and diluted with 18,000 g of water. After the resulting slurry was stirred for an hour, the solid was collected by filtration and washed with water until free of acid. The resultant presscake was slurried in 5,700 g of water, 70 g of 50% caustic sodium hydroxide, and 8,600 g of methanol, and the resultant slurry was heated at 110°–120° C. for 6 hours in a closed system (e.g., pressure reactor). Upon cooling to 40°–50° C., the slurry was filtered and washed with water. (The wet cake could be dried in an oven (60° C.) or used as is for specific applications.) Upon drying, about 700 g of the solid solution was collected as a brilliant red-violet solid having an X-ray pattern identical to that of the solid solution prepared in Example 1.

EXAMPLE 12

Comparison

Example 12 describes the preparation of a solid solution and a physical mixture of 2,9-dimethoxyquinacridone and 2,9-dimethylquinacridone (not according to the invention).

A solid solution of 90 parts by weight of 2,9-dimethoxyquinacridone and 10 parts by weight of 2,9-dimethylquinacridone were prepared according to U.S. Pat. No. 3,160,510 using the proportions of Example 13F and the specified method of Example 9.

A physical mixture having the same relative proportions was prepared by physically mixing the individual pigments as powders in the same weight ratio as used in the solid solution.

Figure 8:
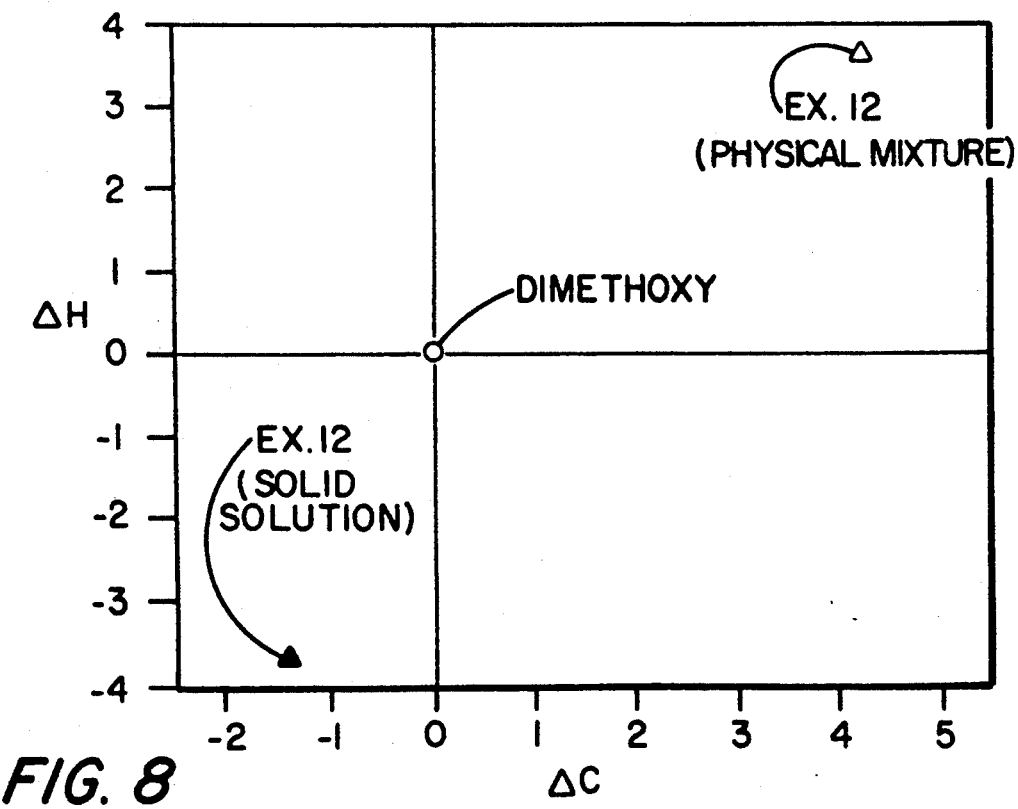
FIG. 8 shows hue and chroma differences (relative to 2,9-dimethoxyquinacridone) between solid solutions and corresponding physical mixtures having various relative amounts of 2,9-dimethoxyquinacridone and 2,9-dimethylquinacridone (not according to the invention).

The following TABLE compares the hue and chroma for the solid solution and physical mixture of comparative Example 12 with those of Examples 9 and 10 of the invention. FIG. 8 shows the data for Example 12 in a form analogous to FIG. 1 (but a different scale).

TABLE

Comparison of color properties

| Example | $\Delta H^{(1)}$ | $\Delta H_{ss}-\Delta H_{pm}{}^{(2)}$ | $\Delta C^{(1)}$ | $\Delta C_{ss}-\Delta C_{pm}{}^{(2)}$ |
|---|---|---|---|---|
| 12 (sol. soln.) | −3.67 | −7.31 | −1.41 | −5.64 |
| 12 (mixture) | 3.64 | | 4.23 | |
| 9 (sol. soln.) | 0.47 | −2.06 | 0.98 | −1.06 |
| 10 (mixture) | 2.53 | | 2.04 | |

(1)$\Delta H$ and $\Delta C$ represent hue and chroma relative to 2,9-dimethoxyquinacridone.
(2)$\Delta H_{ss}$ and $\Delta C_{ss}$ represent $\Delta H$ and $\Delta C$ for solid solutions and $\Delta H_{pm}$ and $\Delta C_{pm}$ represent $\Delta H$ and $\Delta C$ for physical mixtures.

The solid solution of Example 12 prepared according to U.S. Pat. No. 3,160,510 exhibits a dramatic decrease in chroma and is thus duller than the corresponding physical mixture. In contrast, the solid solution of Example 9 of the present invention, even though not a preferred embodiment, exhibits significantly smaller differences in ΔH and ΔC relative to the corresponding physical mixture. The dramatic differences between the solid solution of the present invention and the comparative solid solution of U.S. Pat. No. 3,160,510 can also be readily seen by comparing FIG. 1 with FIG. 8.

EXAMPLE 13-16

Applications

EXAMPLE 13

Preparation of Enamel Paints

A finely divided 8 g sample of the pigment of Example 11 was dispersed in 92 g of a stoving enamel having the following composition:
33% alkyd resin (e.g., AROPLAZ® 1453-X-50 alkyd resin, Reichhold Chemicals, Inc., White Plains, N.Y.)
15% melamine resin (e.g., RESIMENE® BM-7507 melamine resin, Monsanto Company, St. Louis, Mo.)
5% glycol monomethyl ester
34% xylene
13% butanol Upon completion of the dispersion the pigmented paint was applied to metal foils and then baked at 130° C. for 30 minutes. The violet coatings were very fast to light and weathering and had good over-lacquering fastness.

Other suitable alkyd resins are products based on synthetic or vegetable fatty acids, such as coconut oil, castor oil, linseed oil or the like. Urea resins can be used instead of melamine resins.

EXAMPLE 14

Preparation of the Thermoplastic Molding

A 0.2 g sample of the pigment of Example 11 was dispersed in 65 g of stabilized polyvinyl chloride and 35 g of diisooctyl phthalate at 160° C. in a mixing mill. A violet film having very good light and migration fastness was obtained.

Synthetic polyamides of caprolactam or of adipic acid and hexamethylenediamine or the polyester condensates of terephthalic acid and ethylene glycol can be colored in a similar manner at 280°–300° C. (in an atmosphere of nitrogen where necessary).

EXAMPLE 15

Preparation of a Printing Ink

A printing ink was prepared by grinding 35 g of the pigment of Example 11, 65 g of linseed oil, and 1 g of a siccative (cobalt naphthenate, 50% strength in white spirit). When used for offset printing on paper, the ink gave violet offset prints exhibiting high brilliance and tinctorial strength and very good light and lacquering fastness properties.

EXAMPLE 16

Preparation of a Metallic Paint

A mixture of 6 g of the pigment of Example 11 in 12 g of xylene, 4.1 of butyl acetate, 0.7 of butanol, and 22.5 g of a 20% solution of cellulose acetobutyrate in 2:1 butyl acetate/xylene was dispersed by agitating for 30 minutes in a shaker containing 2 to 3 mm diameter glass beads. To this dispersion was then added 10 g of a saturated polyester resin (available as DYNAPOL® H 700 from Huls America), 7.3 g of melamine resin, 8.7 g of a 20% solution of cellulose acetobutyrate in 2:1 butyl acetate/xylene, 18 g of butyl acetate, 1.6 of butanol, and 9.7 g of xylene and shaking was continued for another 5 minutes.

Metallic paints were then prepared by adding a dispersion of aluminum paste (60% solids; available as SPARKLE® SILVER®AR from Silberline Manufacturing Co., Inc.) in xylene (about 1:2) in amounts such that the ratio of pigment to aluminum was between about 80:12 and 1:99.

These metallic paints were applied to panels and after drying were coating with a clearcoat based on an acrylate/melamine resin (which can contain additional additives, such as ultraviolet absorbers). The resulting brilliant violet metallic paint exhibited good light and weather fastness.

What is claimed is:

1. A violet quinacridone pigment composition consisting essentially of a solid solution of
    (a) 95% to 5% by weight of 2,9-dimethoxyquinacridone, and (b) 5% to 95% by weight of 2,9dichloroquinacridone, wherein said pigment composition is characterized by an X-ray diffraction pattern that is different from the sum of the X-ray diffraction patterns of the individual quinacridone components.

2. A pigment composition according to claim 1 wherein 80% to 20% by weight of 2,9-dimethoxyquinacridone and 20% to 80% by weight of 2,9-dichloroquinacridone are used.

3. A pigment composition according to claim 1 wherein 80% to 50% by weight of 2,9-dimethoxyquinacridone and 20% to 50% by weight of 2,9-dichloroquinacridone are used.

4. A colored macromolecular material containing a colorant wherein said colorant comprises a pigment composition of claim 1.

5. A printing ink containing a colorant wherein said colorant comprises a pigment composition of claim 1.

6. A paint containing a colorant wherein said colorant comprises a pigment composition of claim 1.

7. A metallic paint containing a colorant and dispersed metallic particles wherein said colorant comprises a pigment composition of claim 1.

* * * * *